June 16, 1964 E. E. NEWHALL 3,137,795

MAGNETIC CONTROL CIRCUITS

Filed June 4, 1959 5 Sheets-Sheet 1

INVENTOR
E. E. NEWHALL
BY
William H. Kamstra
ATTORNEY

INVENTOR
E. E. NEWHALL
BY
William H. Kamstra
ATTORNEY

INVENTOR
E. E. NEWHALL
BY
William H. Kamstra
ATTORNEY

INVENTOR
E. E. NEWHALL
BY
William H. Kaustia
ATTORNEY

June 16, 1964 E. E. NEWHALL 3,137,795

MAGNETIC CONTROL CIRCUITS

Filed June 4, 1959

5 Sheets-Sheet 5

INVENTOR
E. E. NEWHALL
BY
William H. Kamstra
ATTORNEY

United States Patent Office 3,137,795

Patented June 16, 1964

3,137,795

MAGNETIC CONTROL CIRCUITS

Edmunde E. Newhall, Metuchen, N.J., assignor to Bell Telephone Laboratories, Incorporated, New York, N.Y., a corporation of New York Filed June 4, 1959, Ser. No. 818,130
23 Claims. (Cl. 307—88)

This invention relates to electrical control circuits, and particularly to electrical circuits adapted to receive input signals representing information in one code or sequence, and generate output signals representing the same information in another code or a different sequence. Such circuits are particularly adapted for use in automatic telephone systems, for example, where they may be employed to convert signals originating at subscriber's stations in one code to signals in another code which may be more compatible with the particular system.

Electrical stepping switches, which are adapted to provide successive output signals on a plurality of output leads responsive to a periodically applied input, are well known. Such circuits advantageously perform a counting function when only a terminal output is produced, the single output indicating that a predetermined number of periodic input signals has been applied. Variations of such stepping and counting circuits also are well known. Thus, electrical conversion circuits which are adapted to receive a coded sequence of input signals, representative of particular information, and which generate output signals representative of the same information in another code are widely used in the telephone art. Code conversions may be performed from a serial input to a parallel output or from a parallel input to a serial or sequential output. Such circuits frequently are designed to accomplish the additional function of providing a buffer between stages of a telephone system which operate at different rates of speed. In the latter case some provision must be made for the temporary storage of the input information before the actual translation is effected. For this purpose, the well-known toroidal magnetic memory cores have proven highly advantageous, and these cores have been extensively employed in signal generating circuits and the like. An exemplary circuit accomplishing the general function contemplated above and one employing magnetic cores is described by H. E. Vaughan in Patent 2,835,741, issued May 20, 1958. In the circuit there described a conversion from a parallel input in one code to a particular sequence of output pulses in another code is performed.

Although the introduction of the magnetic core displaying substantially rectangular hysteresis characteristics has made possible a new order of reliability, longevity, and circuit economy in pulse switching and memory circuits, their use has also frequently been attended by problems. Thus, for example, the relatively rigid requirement of physical uniformity, complexity of fabrication, and power requirements, are familiar considerations in this connection and these problems have been given extensive treatment in the art.

The advent of magnetic structures which, unlike the conventional toroidal core, are formed to present a complex of flux paths, has made possible a general simplification of electrical circuits employing magnetic memory elements. By means of such structures, logic, switching, translation operations, and the like, are made possible by controlling flux redistributions within a single unitary magnetic element. A structure such as that here contemplated may take the form, for example, of the ladder-like structure described by T. H. Crowley and U. F. Gianola in the copending application Serial No. 732,549, filed May 2, 1958, now Patent No. 2,963,591 issued December 6, 1960. The magnetic structure there described may be fabricated of any of the well-known ferrite materials, and additionally may display substantially rectangular hysteresis characteristics if a memory function is required. One form of the structure comprises a pair of side rails between which a plurality of transverse members are disposed. The side rails together with the transverse members present a plurality of closed magnetic flux paths. As a result, flux induced in one transverse member by an applied magnetomotive force may be completed in whole or in part through the side rails and through one or more of the other transverse members. Flux changes in selected members or side rails may then be utilized to induce desired output signals in coupled windings to realize particular control functions.

In such prior art magnetic structures, the propagation of an induced flux is thus controlled to inductively couple an input winding and a selected one or more of a plurality of output windings of the structure. It has been found that when all of the available paths are flux limited, that is, when each has the same minimum cross-sectional area, a flux induced in a portion of the structure common to all of the paths will be completed through a flux path defined by the nearest available structural member without regard to the magnitude of the applied magnetomotive drive force. It has further been found that when a magnetic structure is driven from a constant voltage drive source, the current first increases to a value so as to exceed the threshold for switching around the shortest path but the current is insufficiently large to exceed the threshold for switching around the next shortest path. When the shortest path has completed switching the current increases and the second longest path commences switching. Thus, where two paths of substantially different lengths are available, flux induced in a structural member common to the two paths may be completed through the shorter path before any flux change at all occurs in the longer path. From an extension of these principles to a magnetic structure presenting a plurality of available flux paths of increasing lengths, a successive flux saturation of members defining the paths was found to follow. Thus, for a constant voltage drive applied to a common member including all of the paths, each of the paths will be flux saturated in turn with the longest path being saturated last.

It is an object of the present invention to apply the foregoing principles of flux propagation in magnetic structures to achieve new and novel electrical pulse switching circuits.

Another object of the present invention is to provide a positive selective control for the propagation of flux in magnetic structures.

It is also an object of this invention to convert information in the form of electrical pulses in one code to electrical pulses in another code.

An object of this invention is the provision of a circuit capable of code conversion, in accordance with the foregoing object which is advantageously adaptable for modification from serial input to parallel output and from parallel input to serial output.

A still further object of this invention is the provision of a new and novel magnetic structure.

Another object of this invention is to provide a new and novel electrical pulse code circuit in which all of the switching is accomplished by means of the control of magnetic flux within a single magnetic structure.

It is also an object of this invention to control the propagation of flux in successive discrete steps in a magnetic structure.

The foregoing and other objects of this invention are achieved in one specific illustrative embodiment thereof comprising a square loop magnetic structure apertured to form a plurality of magnetic legs. All but one of the legs are of the same minimum cross-sectional area, the one leg, designated the drive leg, having a minimum cross-sectional area at least equal to the sum of the minimum cross-sectional areas of the other legs, which latter legs may be designated the counting legs. Each of the legs is joined to each of the others in a manner such that a saturation flux in each of the counting legs may be simultaneously closed through the drive leg. Inductively coupled to the drive leg are a drive and a reset winding, and output windings are coupled to selected ones of the counting legs. Assuming the magnetic structure to be initially normally magnetized in a manner such that a remanent flux is present in the drive leg in one direction, then this remanent flux is completed in the other direction through each of the counting legs. When the first of a series of electrical input signals is applied to the drive winding, a magnetomotive force is developed and applied in the opposite direction to the drive leg.

In accordance with the principles described hereinbefore, the induced reverse flux seeks its closure through the nearest of the counting legs. An output winding coupled to the latter counting leg will have a step voltage signal induced therein as a result of the flux change, which step signal is advantageously employed to control the cutoff of the input signal source. Upon the interruption of the received input signal, further flux induction in the drive leg and its propagation through the first counting leg ceases. The circuit has thus been advanced one step or "stage" in its sequence and the information element represented by the first input signal is thus stored in this "stage" of the magnetic structure pending the application of subsequent input signals.

When a second input signal is applied to the drive winding, additional reversing flux is induced in the only partially saturated drive leg of the magnetic structure. The first and nearest counting leg, however, is already driven to its remanent point and will permit only a negligible additional flux. As a result, the reverse flux now induced in the drive leg is forced to close itself through the next available path. Ideally, this path will be presented by the next succeeding counting leg. However, as will be explained in detail hereinafter, it may frequently be advantageous to utilize the complete saturation of a counting leg further along in the core structure than the immediately succeeding leg. An output winding coupled to such a leg will again have a step signal induced therein by the reversing flux which signal is again applied to cut off the input signal source, and thereby interrupt the input signal. Any further flux change in the magnetic structure is thereby prevented and the circuit is again prepared for the introduction therein of a succeeding input signal.

As successive input signal pulses are applied to the drive winding the reversing flux in the drive leg of the magnetic structure is increased in steps corresponding to the received input signal pulses, with each successive flux step being completed through the next selected available counting leg. This operation is continued until the last leg of the structure is reached. At this point, the flux reversal in te last leg completes the reversal of all of the flux in the magnetic structure from its normal directional state. A reset drive pulse from an external source applied to the reset winding may now switch the flux in the drive leg in its entirety thereby restoring the flux therein to its normal state, with a corresponding flux restoration taking place in each of the counting legs. The magnetic structure will now be in a condition to repeat the cycle of operation upon the introduction of a succeeding series of input signals.

As thus far generally described, it may readily be seen that the magnetic structure may be adapted to operate as a simple counter which may be modified to count on the basis of any selected radix. In such an adaptation, the final output signal may advantageously be employed to trigger the external reset drive source. An automatic resetting counter may thus be realized. By arranging for a suitable number of counting legs, the circuit may be caused to step through any desired number of stages before a reset output is generated.

The present invention, however, also includes within its scope other and related embodiments. Thus, conversion of the information represented by the serially applied input signals may advantageously be accomplished during either the input phase or the reset phase of operation. By selectively providing the counting legs with code output windings, coded signals representing the input information may be generated either as the result of flux changes during the input set phase or as a result of the flux changes during the reset phase. In another embodiment of this invention, input information signals are introduced into the circuit in parallel form and converted to a serial, sequential output. Selected legs of the core structure are flux controlled so that periodically applied drive pulses cause flux reversals in only particular coded ones of the counting legs. Serially connected output windings coupled to each of the legs will, as a result, be energized in sequence, the number of such energizations corresponding to the input information converted to the output code. Other adaptations of this invention will be described in the detailed description thereof hereinafter.

It will be appreciated that the ideal condition of flux propagation as described above may not always obtain. Thus, although in theory successive steps of flux through the sequence of counting legs should pass discretely from one leg to another, in practice some leakage of flux occurs. Thus, a step of flux may completely saturate a desired leg and partially flow over into a succeeding second or third leg. In accordance with one aspect of this invention, positive control of the successive steps of flux propagation is afforded by providing a biasing winding for each of the succeeding legs. By energizing this bias winding each time a drive pulse is applied to the drive winding, the step of flux is effectively prevented from passing the point in the sequence of legs representing the extent of the count. Advantageously each stage of the magnetic structure thus includes as few legs as the control of the flux propagation will permit. In the ideal case described in the foregoing, each stage comprises only a single leg and the flux propagation is caused to step in discrete stages from leg to leg.

In accordance with another aspect of this invention each leg is in actuality made an output leg—or an input leg—depending upon whether the conversion is serial to parallel or parallel to serial. Two identical apertured magnetic structures of the character above described are adjacently disposed in a coincident relationship. The drive legs of each are simultaneously driven by applied drive pulses. The closure of the switched or reversing flux in each magnetic structure, however, is differently controlled by a flux biasing arangement such that the flux in the first leg of the first structure completes its reversal before the complete reversal of flux takes place in the first leg of the second structure. The former reversal is effective to induce a signal to interrupt the input drive signal source in the manner previously generally described, whereupon further flux propagation is arrested. The operation is continued upon the application of succeeding drive pulses with each next succeeding leg of the first structure having its flux reversed before that of the next succeeding leg of the second structure. Each time, the flux reversal in the legs of the first structure generates a signal for controlling the interruption of the input drive pulse source before more flux propagation can take place in the first structure.

It is to be noted that positive control of flux propagation in the contemplated magnetic structure may also be realized by suitably selecting the physical dimensions of the structure. Thus, the apertures may be so dimensioned that the lengths of the resulting successive flux paths will insure that little if any induced flux is available to flow over into a succeeding leg before the input drive pulse is interrupted. The novel biasing arrangement alone or in combination with a dual structure thus advantageously provides a simple means for utilizing apertured structural magnetic forms having standardized aperture dimensions.

In accordance with its broadest aspects, it is a feature of this invention that all of the switching in an electrical control circuit be accomplished by the controlled propagation of flux in successive steps in a single unitary magnetic structure. The square loop characteristics of the structure insure the retention of the counted information without the expenditure of power between the applied current pulses.

It is another feature of this invention that an output signal generated by a flux propagation in a magnetic device by an applied input current, is effective to control the cutoff of the input current.

It is also a feature of this invention that a final output signal generated by a flux propagation in a magnetic device by an applied input current may be employed to control the flux clearing or reset of the device.

According to one aspect of this invention, it is a feature thereof that positive control of flux propagation in a magnetic device is afforded by biasing windings coupled to flux paths in the device. The biasing windings may be self-energized or they may be externally energized coincidentally with a succession of flux excursions to prevent the closure of flux through particular paths of the device to thereby maintain the flux excursion between successive discrete limits.

According to still a further aspect of this invention, it is a feature thereof that the new and novel magnetic structure employed may be wired to realize various and numerous information output codes either in parallel form or in a time sequence.

It is another feature of this invention that the propagation of flux be simultaneously controlled in a plurality of identical apertured magnetic structures. A biasing winding is coupled through the apertures of the cores in a manner such that a flux closure will always be completed in a leg of one structure before closure is completed through the corresponding leg of the other structure. Flux changes in either one of the structures may then control the required output signals.

The foregoing and other objects and features of this invention will be better understood from a consideration of the detailed descriptions of illustrative embodiments thereof which follow when taken in conjunction with the accompanying drawing in which:

FIGS. 1 and 2 taken together are a schematic representation of one specific illustrative embodiment of the present invention adapted as a decimal serial to two-out-of-five parallel conversion circuit;

Figure 1:
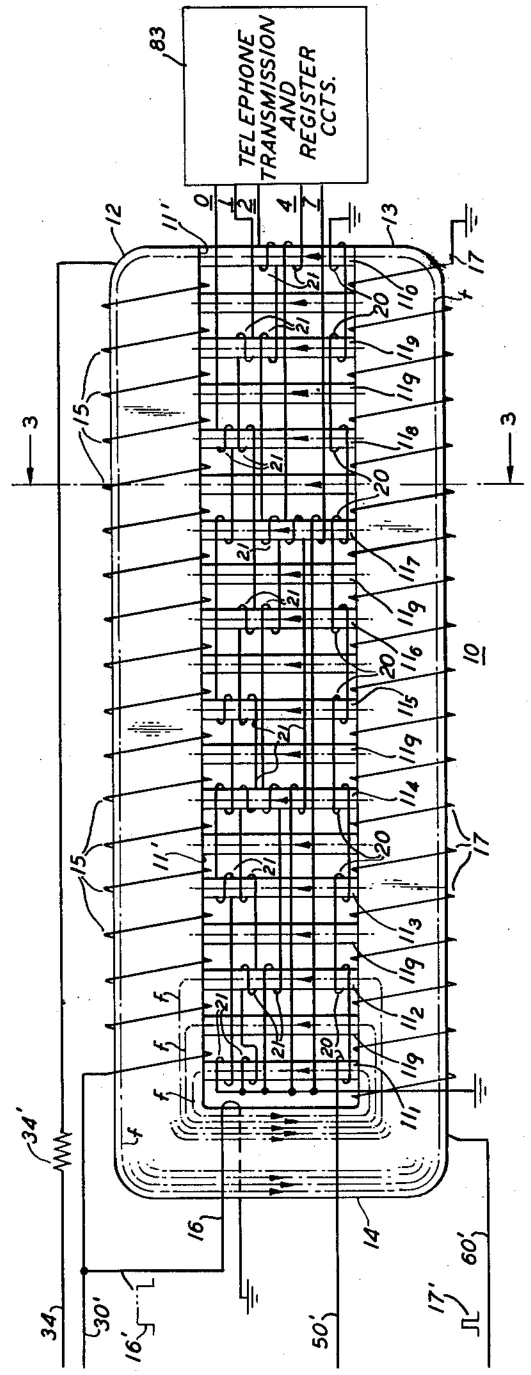
Figure 2:
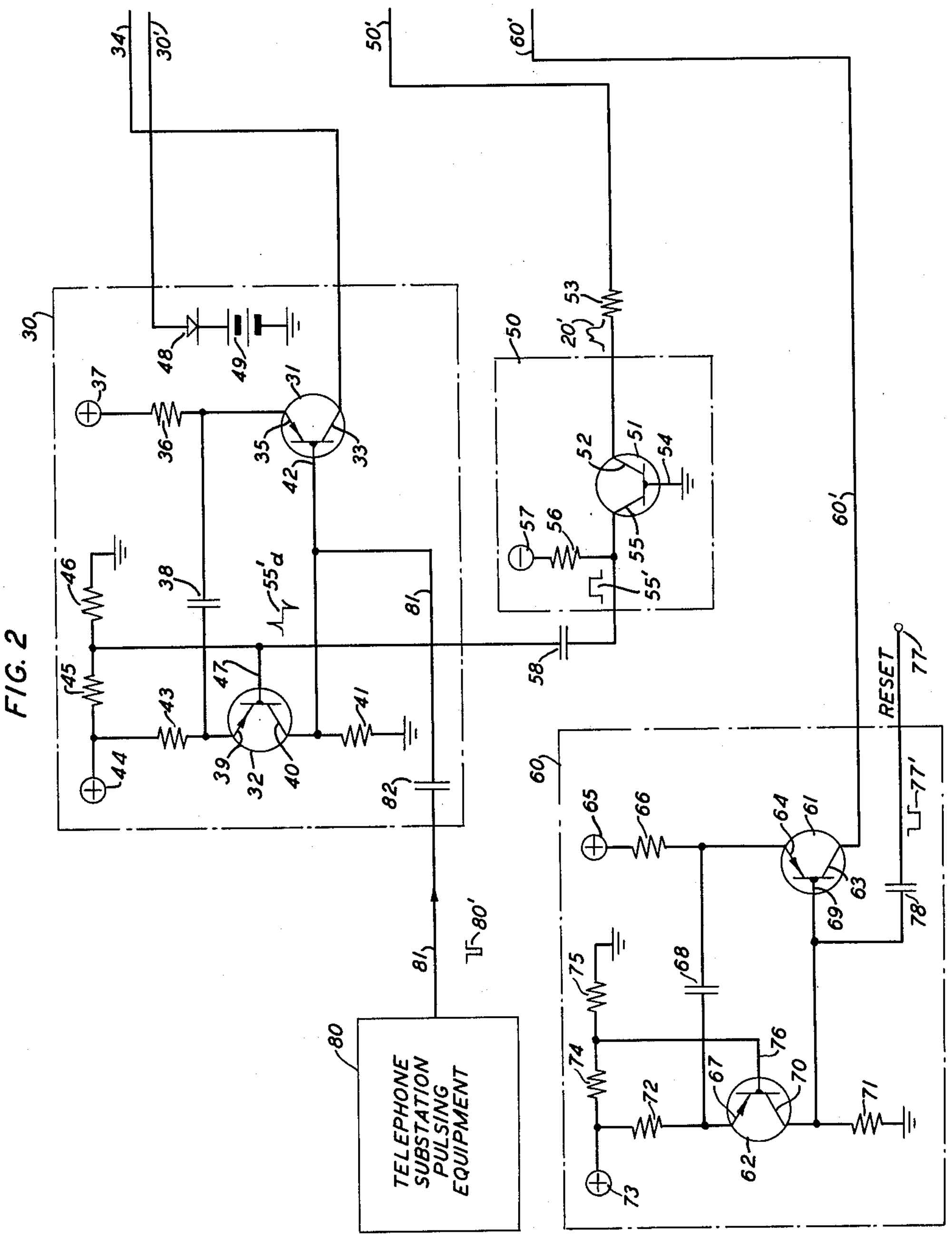

The illustrative embodiment of this invention depicted in FIGS. 1 and 2 comprises as its switching means a magnetic structure 10 advantageously formed of any well-known magnetic material exhibiting substantially rectangular hysteresis characteristics. The magnetic structure 10 is apertured to present a plurality of legs 11, a pair of side rails 12 and 13, and a drive leg 14. The minimum cross-sectional areas of the drive leg 14 and of each of the side rails 12 and 13 are at least equal to the sum of the minimum cross-sectional areas of the plurality of legs 11. To retain the dimensions of the core structure 10 within convenient limits the foregoing relationship between the cross-sectional areas of the drive leg 14 and side rails 12 and 13 and the sum cross-sectional areas of the legs 11, the core structure 10 may be slotted as more clearly shown in the cross-sectional view of FIG. 3. By providing the slot 11' the width of the drive leg 14 and side rails 12 and 13 may be reduced and still realize the required cross-sectional relations.

The physical dimensions of the magnetic structure 10 thus permit a saturation magnetic flux in each and all of the legs 11 to be simultaneously closed through the side rails 12 and 13 and the single drive leg 14. In the particular embodiment being described, 19 legs designated by the numeral 11 are provided in accordance with the illustrative adaptation of the invention as a decimal serial to two-out-of-five parallel conversion circuit. More particularly the 19 legs 11 are provided to accomplish the conversion of conventional subscriber substation dial pulses to a two-out-of-five code for transmission to the telephone system register equipment. The advantages of providing 19 such legs will be more specifically described hereinafter.

A biasing winding 15 is inductively coupled to the magnetic structure 10 in a manner such that the flux closure through each of the legs 11 except the first of the series is coupled by the winding 15 at least once. In the embodiment being described, it was found convenient to thread each of the apertures forming the legs 11 thereby effecting the winding about the side rail 12. The drive leg 14 has inductively coupled thereto a drive winding 16 and a distributed reset winding 17. The distributed reset is peculiar to this embodiment and permits all the parallel paths to be reset simultaneously, thus effecting an advantageous algebraic voltage cancellation described in detail hereinafter. The legs 11, which may here be designated counting legs for purposes of description, are alternately numbered $\mathbf{11_1}$ through $\mathbf{11_0}$, each of the legs so numbered being separated from its next succeeding numbered leg by an interposed guard leg $\mathbf{11_g}$. Each of the legs $\mathbf{11_1}$ through $\mathbf{11_0}$ has coupled thereto a step output winding 20, which windings 20 are serially connected and one end of the series is connected to ground.

Each of the counting legs $\mathbf{11_1}$ through $\mathbf{11_0}$, in addition to the windings described above also has coupled thereto a plurality of code output windings 21 connected in an output network in accordance with a particular information output code. Since the latter code is here a conventional two-out-of-five code and the conversion of a count only to the base 10 is required, five output leads, designated by the two-out-of-five code elements 0, 1, 2, 4, and 7, are provided. The output lead 0 connects in series code output windings 21 coupled to the legs $\mathbf{11_1}$, $\mathbf{11_4}$, and $\mathbf{11_7}$ in one sense and code output windings 21 coupled to the legs $\mathbf{11_3}$, $\mathbf{11_5}$, and $\mathbf{11_8}$, in the opposite sense. The output lead 1 connects in series code output windings 21 coupled to the legs $11_1$, $11_3$, $11_5$, and $11_8$ in the one sense and code output windings 21 coupled to the legs $11_2$, $11_4$, $11_6$, and $11_9$ in the opposite sense. The output lead 2 connects in series code output windings 21 coupled to the legs $11_2$, $11_6$ and $11_9$ in the one sense and code output windings 21 coupled to the legs $11_4$, $11_7$, and $11_0$ in the opposite sense. The output lead 4 connects in series code output windings 21 coupled to the legs $11_4$ and $11_0$ in the one sense and a code output winding 21 coupled to the leg $11_7$ in the opposite sense. Finally, the output lead 7 is connected to a code output winding 21 coupled to the leg $11_7$ in the one sense. Each of the output leads 0, 1, 2, 4, and 7 is connected at one end to ground.

The drive winding 16 coupled to the drive leg 14 is connected at one end to ground and at the other end via a conductor 30' and via bias winding 15 and conductor 34 to a drive monopulser 30 which latter component may be any suitable circuit known in the art capable of producing a drive input signal of the character, and controllable in the manner, to be described. An exemplary such circuit which was found advantageous is shown in FIG. 2 and comprises a first and a second transistor 31 and 32. The transistor 31 has its collector element 33 connected to a conductor 34 which latter conductor is connected at the other end to one end of the biasing winding 15. The other end of the biasing winding 15 is connected to the ungrounded end of the drive winding 16. The emitter 35 of the transistor 31 is connected through a resistor 36 to a source of positive potential 37 and also through a capacitor 38 to the emitter 39 of the transistor 32. The collector 40 of the transistor 32 is connected to ground through a resistor 41 and also to the base 42 of the transistor 31. The emitter 39 is also connected through a resistor 43 to a source of positive potential 44. Connected between ground and the potential source 44 is a voltage divider comprising resistors 45 and 46, a tap of which is connected to the base 47 of the transistor 32. A diode 48, serially connected to a grounded battery 49, is connected to the input end of the drive winding 16 via conductor 30'. The input end of the drive winding 16 is also connected to the biasing winding 15 via current limiting resistor 34' and conductor 34 to emiter 33.

The serially connected step output windings 20 are connected to a feedback amplifier 50 via a conductor 50'. The latter amplifier 50 comprises a transistor 51 having its emitter 52 connected through a resistor 53 to the conductor 50' and the first of the step output windings 20 coupled to the counting legs $11_1$. The base 54 of the transistor 51 is connected to ground and the collector 55 of the transistor 51 is connected through a resistor 56 to a source of negative potential 57. The collector 55 is also connected through a capacitor 58 to the base 47 of the transistor 32 and also to the tap of the voltage divider comprising the resistors 45 and 46 of the drive monopulser 30. The reset winding 17 is connected at one end to ground and at the other end to a reset monopulser 60 via a conductor 60', which later monopulser in structure and operation may be substantially similar to the drive monopulser 30. The reset monopulser 60 comprises a first and a second transistor 61 and 62, the other end of the reset winding 17 being connected to the collector 63 of the transistor 61. The emitter 64 of the latter transistor is connected to a source of positive potential 65 through a resistor 66.

The emitter 64 of the transistor 61 is also connected to the emitter 67 of the transistor 62 through a capacitor 68. The base 69 of the transistor 61 is connected directly to the collector 70 of the transistor 62 and also through a resistor 71 to ground. The emitter 67 of the transistor 62 is connected through a resistor 72 to a source of positive potential 73. Connected between ground and the potential source 73 is a voltage divider comprising resistors 74 and 75, and a tap of the latter voltage divider is connected to the base 76 of the transistor 62. A terminal 77 permits the application of reset pulses of the character to be described to the base 69 of the transistor 61 via a capacitor 78.

The illustrative embodiment being described may advantageously be adapted for use in connection with an automatic telephone system and, so adapted, input information in the form of pulses controlled by conventional subscriber substation dialing or other pulsing equipment is supplied to the drive monopulser 30 from the source 80 via a conductor 81 and coupling capacitor 82. The input pulses are applied directly to the base 42 of the transistor 31. The output network comprising the output code leads 0, 1, 2, 4, and 7 in this context may be connected to information utilization means comprising telephone transmission and register circuits 83. Since neither the source 80 nor the circuits 83 comprise a part of the present invention, they need not be described in further detail herein.

With the foregoing description of the elements of an illustrative embodiment of this invention, an illustrative cycle of operation may now be described. Assume for this purpose a magnetic flux distribution in the core structure 10 such as that represented by the broken lines $f$. Each of the broken lines $f$ is understood to be a closed loop and to represent a particular flux value in the drive leg 14 which flux $f$ is closed through one of the counting legs 11 in the direction indicated by the arrowheads.

For purposes of description, it will be further assumed that a train of pulses representing the dialed decimal digit seven originating at a subscriber substation is to be counted and converted to a two-out-of-five coded output. The dial pulses are further assumed to be converted to negative-going current pulses 80' by equipment not shown, but known in the art, in order to operate the drive monopulser 30. In the latter monopulser the transistor 32 is normally conducting with the transistor 31 normally being cut off. Upon the application of the first of a train of periodic negative pulses 80' to the base 42 of the transistor 31 via the conductor 81, the transistor 31 begins to conduct current between its emitter 35 and collector 33. A resulting voltage drop across the resistor 36 is applied through the capacitor 38 to the emitter of the other transistor 32 which tends to cut off the latter transistor. This operation is regenerative, ending with the normally conducting transistor 32 completely cut off and the normally cutoff transistor 31 conducting. Substantially all of the current flowing in the collector 33 at this time is conducted via the conductor 34 through the biasing winding 15 and to the diode 48. The serially connected battery 49 provides a back-bias for the diode 48 to maintain a constant voltage across the parallelly connected drive winding 16. The normally stable time of the monopulser 30, that is, the time that the normally conducting transistor 32 may be held conducting, is determined primarily by the RC constant of the capacitor 38 and resistor 43. However, the operation of the monopulser 30 here involves its restoration to its normal operative state before the aforedetermined stable period terminates. This restoration is controlled by a succeeding step in the operation of the circuit to be described.

The operative conducting time of the transistor 31 is such that a voltage pulse 16' is applied to the drive winding 16 of a magnitude sufficient to switch all of the flux in the drive leg 14. The direction of the winding 16 is by inspection of FIG. 1 shown to be in a sense such that the applied voltage pulse produces a magnetomotive force opposite in direction to that of the normal flux represented by the broken lines $f$. When the drive voltage 16' is applied to the drive winding 16 the flux in the drive leg 14 begins to switch and, in accordance with the principles stated earlier herein, the switching flux will close first through the shortest available path. This path is presented through the counting leg $11_1$ which leg is driven to saturation in the direction opposite that indicated by the arrow. As a result a step output voltage signal 20′ is induced in the step output winding 20 coupled to the leg $11_1$ which signal 20′ is transmitted across the resistor 53 to the emitter 52 of the transistor 51 of the feedback amplifier 50. The latter transistor 51 is normally non-conducting, but is driven hard by the step signal 20′ and as a result an essentially square signal 55′ appears on the collector 55. The latter voltage is differentiated by the network comprising resistors 45 and 46 and the capacitor 58, and applied as a signal $55_d'$ to the base 47 of the transistor 32 of the drive monopulser 30. The initially positive spike of the differentiated signal $55_d'$ merely drives the transistor 32 further to cut off thus aiding the regenerative action of the monopulser 30 in producing the drive voltage signal. The immediately following negative spike of the differentiated signal $55_d'$ restores the transistor 32 to its normal conducting state and as a result transistor 31 is cut off. At this time, and as a result of restoration of the drive monopulser 30 to its normal operative state, the drive voltage pulse 16′ applied to the drive winding 16 is also terminated, thereby precluding any further flux switching in the drive leg 14.

Before proceeding to the cooperation of the biasing winding 15 and the response of the circuit to the application of a succeeding periodic input pulse 80′, an understanding of this invention will be abetted by a consideration of the flux propagation behavior in the magnetic structure 10. Although the flux in the drive leg 14 switched by the drive voltage applied to the drive winding 16 first found a closure path through the desired counting leg $11_1$, an overflow switching flux begins immediately to switch the flux in the next adjacent guard leg. The latter flux switching begins before the flux in the selected leg $11_1$ has been completely switched. In an unfavorable case such a flow over may begin even in the next following counting leg $11_2$ before total switching saturation can be acocmplished in the first counting leg $11_1$. This overlap of flux switching is graphically depicted in FIG. 4A. The latter figure may be read in conjunction with FIG. 4 where a comparison of the various generated control pulses is shown. The normally cutoff transistor 31 of the drive monopulser 30 begins to conduct at the time $t_1$ as the result of the application of the input negative pulse 80′. The drive voltage pluse is shown plotted against time as the pulse 16′ in the line II. The flux reversals in the successive counting and guard legs $11_1$, $11_g$, $11_2$, $11_g$, and $11_3$ are plotted against the current drawn by the drive winding 16 during the application of the voltage pulse 16′ in FIG. 4A. The approximate flux excursions in the directions indicated by the arrow leads are shown to overlap as the voltage pulse 16′ is maintained. Thus, it is apparent that the flux in the guard leg $11_g$ separating the counting legs $11_1$ and $11_2$ and also the flux in the counting leg $11_2$ begins to switch in this case before the flux in the counting leg $11_1$ has been driven to saturation in the switching direction. This overlapping of flux switching in successive counting legs will also result in an overlapping of generated output signals in the step output windings 20, thereby presenting the problem of discriminating between them. An inspection of the flux curves in FIG. 4A demonstrates that, according to one of the principles of this invention, the necessary discrimination between generated step signals may be achieved by selecting the step output counting legs of the magnetic structure 10 at suitable intervals. Thus, it is apparent that a suitable separation between step output signals could be achieved by selecting the legs $11_1$ and $11_3$ as operative counting legs. It is readily apparent from FIG. 4A that the flux excursions in the latter legs as the result of the applied voltage pulse 16′ would be sufficiently separated in time to prevent an overlap of generated step output signals.

In an alternate arrangement, the counting legs may be so physically spaced and separated that the flux switching induced in one leg is completed before a flux excursion begins in even the immediately succeeding leg. Such a selection of counting legs and arrangements based on the selection of particular physical dimensions of the structure 10 and the spacing of the legs therein are also to be understood as encompassed within the scope of this invention.

According to one of the features of this invention, the selection of either widely separated counting legs or the particular choice of physical dimensions of the successive apertures of the structure 10 is advantageously obviated. By providing the biasing winding 15, shown in the embodiment of FIGS. 1 and 2, energized simultaneously with the energization of the drive winding 16, the objectives of the immediately foregoing physical means are effectively achieved. When the transistor 31 of the monopulser 30 conducts, the current path may be traced from the collector 33, current limiting resistor 34′, conductor 34, biasing winding 15, and the parallel branch paths including the diode 48 and battery 49 in one and the drive winding 16 in the other, to ground. The direction of the current in the biasing winding 15 is such as to maintain the flux in the side rail 12 and, therefore, in the entire structure 10 in its normal state as indicated in FIG. 1. It will be recalled that the biasing winding 15 couples the flux in each of the legs 11 except the flux in the leg $11_1$. As a result, the magnetomotive force generated by the drive current in the drive winding 16 is opposed with respect to all of the legs 11 except the leg $11_1$. The flux in counting leg $11_1$ will therefore be substantially switched before the flux in the next succeeding guard leg or counting leg $11_2$ begins to switch. The drive winding 16 as a result begins to draw more current to overcome the countering biasing effect and the guard leg immediately adjacent the leg $11_1$ begins to switch its flux. At this point, however, the flux change in the switching leg $11_1$ induces the step output voltage signal 20′ in its coupled winding 20 to control the interruption of the drive voltage pulse 16′ at a time $t_3$. As stated previously, further flux switching in the counting and guard legs 11 is thus interrupted, the counting leg $11_1$ being left fully switched and the next following guard leg being only partially switched. The step output signal 20′ and the square voltage cutoff signal 55′ together with its differentiated form $55_d'$ are shown respectively in lines III, IV, and V of FIG. 4. The time $t_2$ merely indicates the time at which the signal 55′ is initiated and only indirectly controls the time $t_3$ at which the drive pulse 16′ is cut off.

Figure 4:
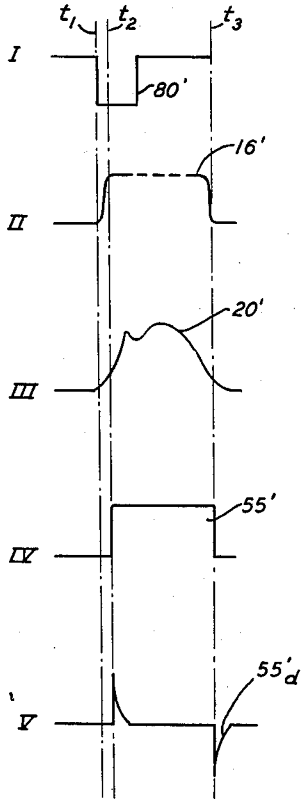
FIG. 4 is a comparison chart showing the time relationship of idealized pulse waveforms occurring at various operative stages of the illustrative embodiment shown in FIGS. 1 and 2.
Figure 4A:
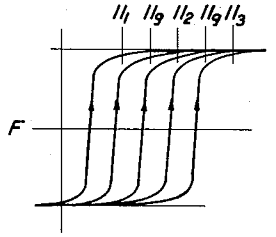
FIG. 4A shows a comparison of the flux excursions occurring in successive counting legs of the embodiment of FIG. 1 when plotted against current.

By the operation of the magnetomotive bias generated by the energized biasing winding 15, the overlapping flux switching effect depicted in FIG. 4A is to a large extent overcome. The applied constant voltage drive pulse 16′, applied approximately at the $t_1$ is cut off at the time $t_3$ to prevent any further flux changes. The times and pulse waveforms shown in FIG. 4 are intended only to show relationship and sequence of operation. It will be understood that the actual times and waveforms will be determined by the particular circuit variables selected in practicing this invention. Although the biasing winding 15 was energized in series with the drive winding 16 and from the same energizing source, the winding 15 could as well have been energized from a synchronous or continuously operating external source. Still another arrangement possible would be the production of a self-bias in which the flux propagation develops a counter magnetomotive force in the biasing winding 15. In the latter case, the biasing winding 15 would comprise a closed loop including only the current limiting resistor 34′.

One step in the input phase of an illustrative cycle of operation has been described in the foregoing. Upon the transmission from the source 80 of the next pulse in the series of seven dial controlled pulses being converted in the illustrative case, the operative steps above described will be repeated. A voltage pulse 16′ again applied to the drive winding 16 will cause the switching of additional flux in the drive leg 14 of the magnetic structure 10. Since the counting leg $11_1$ is now already saturated in the switching direction and the next adjacent guard leg partially so, flux closure in the next step will be had through the latter leg and through the counting leg $11_2$. The switching of the flux in the leg $11_2$ again causes the generation of a step output signal 20′ in its coupled output winding 20 to control the interruption of the drive voltage pulse 16′. The successive closing of flux is continued to switch the flux in the succeeding counting and guard legs in response to the successive applications of the remaining input signals representing the dial controlled pulses. When the train of seven input signals has been received in accordance with the illustrative operation being described, the counting legs $11_1$ through $11_7$ together with the interposed guard legs will have been flux switched to the opposite or "set" direction, and the input phase of operation will have been completed.

The counting legs $11_8$ through $11_0$ and interposed guard legs will still be in the normal flux condition since the drive voltages applied to the drive leg 14 have been insufficient in number to cause reversing flux closures through these legs. In the reset or output phase of operation, a negative going reset trigger pulse 77′ is applied to the conductor 77. This pulse 77′ may be supplied from an external source, not shown in the drawing, controlled to operate at a time dictated by the demands of the telephone system of which the present illustrative embodiment is part. The pulse 77′ is conducted via the capacitor 78 and applied to the base 69 of the normally cutoff transistor 61 of the reset monopulser 60. The operation of the latter monopulser is substantially similar to that of the drive monopulser 30, a description of the operation of which was provided previously herein. Thus, in the reset monopulser 60, the transistor 62 is normally conducting. The negative pulse 77′ causes the transistor 61 to conduct, thereby causing a positive current pulse 17′ to be applied to the reset winding 17 coupled to the side rail 13. The normal conducting time and, therefore, the duration of the pulse 17′ will be determined by the discharge time of the capacitor 68 through the resistor 72, and the pulse 17′ will be of a duration and magnitude to switch the flux in the farthermost leg of the structure 10. Furthermore, the distributed nature of the reset winding 17 insures that all the counting legs are reset together, thus permitting instantaneous addition or subtraction of the voltages developed on the coded output windings inductively coupled to the counting legs 11. The sense of the reset winding 17 is such that a magnetomotive force is developed by the pulse 17′ in a direction to reset all of the flux in the coupled drive leg 14 back to its normal magnetic state. The reset flux closure will be accomplished through each of the counting and guard legs set during the input phase of operation by the incoming train of dial controlled pulses. The set flux in each of the legs $11_1$ through $11_7$ will be simultaneously switched to its normal state indicated in FIG. 1 of the drawing by the directional arrowheads. The guard legs separating the latter legs will also be reset at this time; however, since only the designated counting legs have code output windings thereon, the flux switching in the guard legs need not be considered in the subsequent operation of the embodiment being described.

Turning now to the code output network including the code output leads 0, 1, 2, 4, and 7, it is evident that, in order to achieve the required coded outputs, the code output windings 21 couple the counting legs in particular sequences and senses. The manner in which the latter characteristics are determined will become clear from the output signals generated on the code output leads responsive to the present resetting operation being described. Code output lead 0 serially connects in one sense code output windings 21 coupled to the resetting counting legs $11_1$, $11_4$, and $11_7$ and in the opposite sense code output windings 21 coupled to the resetting counting legs $11_3$ and $11_5$. The voltages induced in the code output windings 21 serially connected by any code output lead may be algebraically summed. Accordingly, such an addition indicates a negative output voltage signal present on the code output lead 0 as a result of the foregoing resetting operation. In a similar manner, it may be established by inspection of FIG. 1 that, as a result of the same resetting operation, the voltages induced on each of the code output leads 1, 2, and 4 algebraically cancel leaving the latter leads effectively unenergized. Since the code output lead 7 is connected to only a single code output winding 21 and that coupled to the resetting counting leg $11_7$, a signal will also be present on the lead 7, which signal is also negative in accordance with the sense of the coupled winding 21. Code output leads 0 and 7 are thus the only leads energized in response to the resetting of the counting legs $11_1$ through $11_7$. This result is precisely in accord with the illustrative code conversion desired, in which code the output leads are energized responsive to decimal digital input pulses as follows:

*Code Output Leads Energized*

| Decimal Input Pulses | 0 | 1 | 2 | 4 | 7 |
|---|---|---|---|---|---|
| 1 | X | X | | | |
| 2 | X | | X | | |
| 3 | | X | X | | |
| 4 | X | | | X | |
| 5 | | X | | X | |
| 6 | | | X | X | |
| 7 | X | | | | X |
| 8 | | X | | | X |
| 9 | | | X | | X |
| 0 | | | | X | X |

The operation of the illustrative embodiment of FIGS. 1 and 2 responsive to the introduction of any of the other decimal digits may be described in a manner identical to that described above for the introduction of the decimal digit seven in the form of a train of dial controlled pulses. In each case the code output leads are energized in accordance with the illustrative decimal to two-out-of-five code chart presented above. The output signals thus representative of a called subscriber directory number, for example, may be transmitted to the transmission and register circuits 83 of the telephone system in which the present illustrative embodiment is adapted for use.

Figure 3:
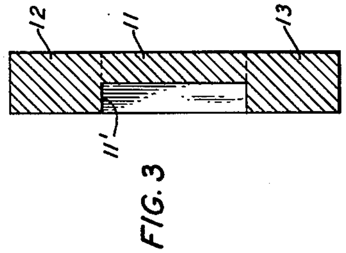
FIG. 3 is a cross-sectional view of the core structure of FIG. 1 taken along the line 3.
Figure 5:
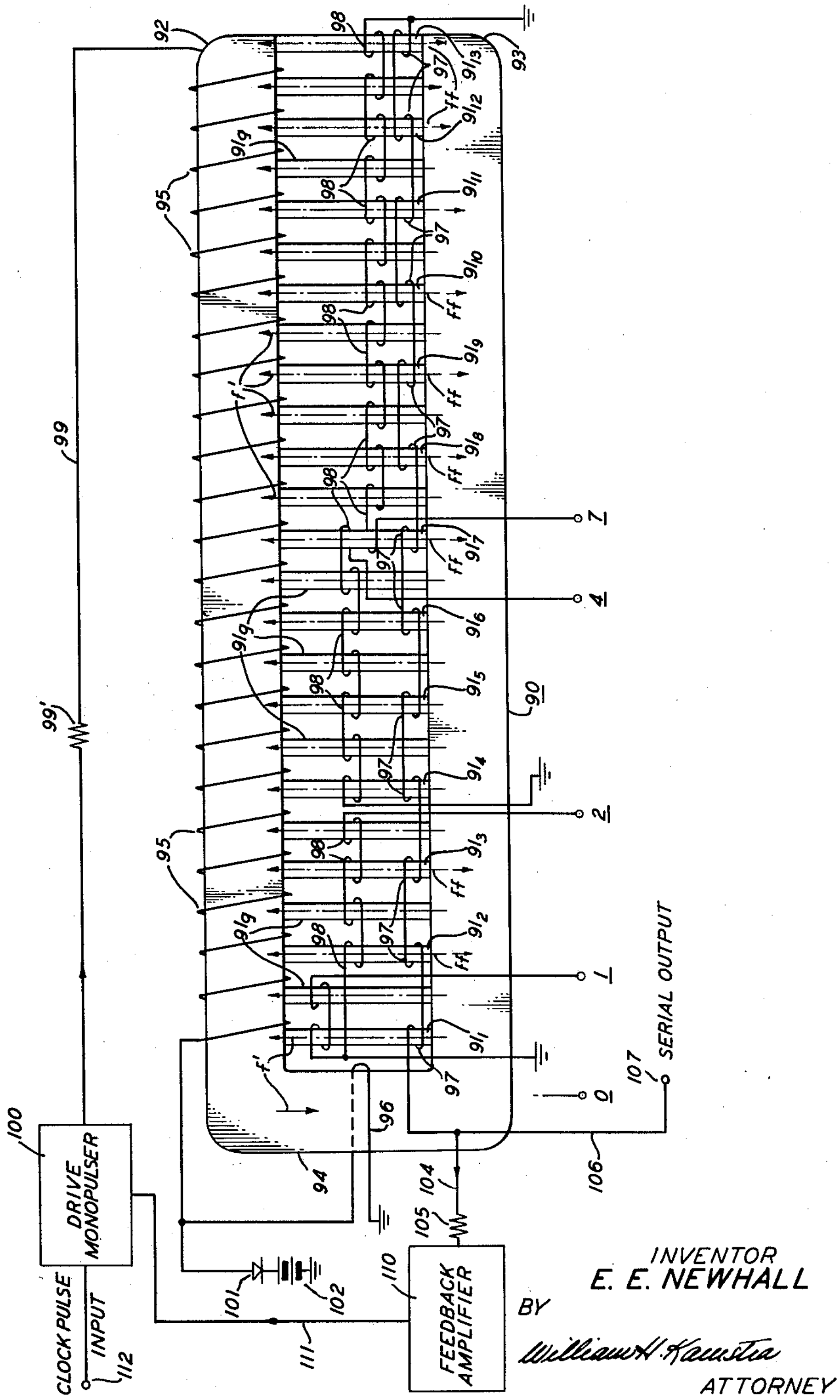
FIG. 5 shows another illustrative embodiment of this invention adapted as a two-out-of-five parallel to decimal serial conversion circuit.

In FIG. 5 is shown a modification of the illustrative embodiment of FIGS. 1 and 2 in which the coded input information to be converted to another code is introduced in parallel form. An apertured core structure 90 having a cross-section substantially similar to that depicted in FIG. 3 is here also employed as a magnetic switching element. The exemplary conversion to be accomplished in the present modification is from a parallel input two-out-of-five code to a serial decimal code output. In accordance with the particular conversion, a number of additional counting and guard legs are provided in the core structure 90. Thus counting legs $91_1$ through $91_{13}$ together with interposed guard legs $91_g$ are sufficient to accomplish the instant conversion. The core structure 90 is also advantageously of a magnetic material displaying substantially rectangular hysteresis characteristics and is formed to bound the counting and guard legs 91 with a pair of side rails 92 and 93 and a drive leg 94. As was the case in connection with the magnetic structure 10 of the embodiment of FIGS. 1 and 2, each of the side rails 92 and 93 and the drive leg 94 has a minimum cross-sectional area at least equal to the sum of the minimum cross-sectional areas of the counting and guard legs 91. This dimensional relationship again permits the simultaneous closing of a saturation flux in the flux paths including each and all of the counting and guard legs 91 and the common flux path presented by the drive leg 94. Wound around the side rail 92 through the apertures of the core structure 90 in a manner linking all of the flux paths except that presented by the first counting leg $91_1$, is a biasing winding 95. A drive winding 96 is coupled to the drive leg 94 and each of the counting legs $\mathbf{91_1}$ through $\mathbf{91_{13}}$ is provided with a step output winding 97. The latter windings are serially connected to ground at one side of the structure 90.

Each of the counting legs $\mathbf{91_1}$ through $\mathbf{91_{13}}$ also has coupled thereto at least one code input winding 98. The latter windings of each of the counting legs are serially connected in accordance with the particular determinative input and output codes. In the present illustrative case, the code input winding 98 coupled to the counting leg $\mathbf{91_1}$ is connected only between ground and an input terminal corresponding to the two-out-of-five code element 1. The code input windings 98 coupled to the counting legs $\mathbf{91_2}$ and $\mathbf{91_3}$ are serially connected together between ground and an input terminal corresponding to the element 2. The code input windings 98 coupled to the counting legs $\mathbf{91_4}$ through $\mathbf{91_7}$ are serially connected together between ground and an input terminal corresponding to the element 4. Finally, the code input windings 98 coupled to the counting legs $\mathbf{91_8}$ through $\mathbf{91_{13}}$ together with an additional code input winding 98 coupled to the counting leg $\mathbf{91_7}$ are serially connected together between ground and an input terminal corresponding to the code element 7. In order to complete the set of input terminals corresponding to each of the two-out-of-five code elements, another terminal 0 is shown. However, as will be seen hereinafter, code pulses on this terminal are unnecessary to effect the particular illustrative conversion to be described. Hence, no circuit connection need be made to this terminal in the present illustrative embodiment.

The biasing winding 95 is connected at one end via a conductor 99 and a current limiting resistor 99' to a drive monopulser 100 and at the other end to the drive winding 96 and one side of a diode 101. The diode 101 is connected at the other side to a grounded battery 102. The other end of the serially connected step output windings 97 is connected via a conductor 104 and a resistor 105 to a feedback amplifier 110. The other end of the serially connected step output windings 97 is also connected via a conductor 106 to a serial output terminal 107. The drive monopulser 100 and feedback amplifier 110 may advantageously comprise components identical to the components 30 and 50 of FIG. 2, respectively, the organization and operation of which was described in detail previously herein. Accordingly, the components 100 and 110 are connected by a control conductor 111. To trigger the drive monopulser 100, a source of periodic clock pulses, not shown, may be connected to the terminal 112 of the drive monopulser 100.

In describing an illustrative code conversion operation of the illustrative embodiment of FIG. 5, it will be assumed that, as a result of a previous cycle of operation, the flux is distributed in the counting and guard legs 91 and drive leg 94 of the core structure 90 in the direction indicated by the broken lines *f'*. An illustrative conversion of the decimal digit nine from its two-out-of-five representation to its decimal sequential pulse form will further be assumed for purposes of description. Referring to the conversion table provided previously herein, it is seen that in accordance with the instant conversion, input signals from an external information source, not shown, are applied simultaneously to the terminals corresponding to the elements 2 and 7 of the code. These signals, which in this case are positive, applied during the input phase of a cycle of operation, will set, or reverse, the normal direction of flux in the counting legs to which the connected code input windings 98 are coupled. The reversing flux is closed through the drive leg 94. Thus, with the terminals 2 and 7 energized, the sense of the windings 98 is such that the counting legs $\mathbf{91_2}$, $\mathbf{91_3}$, and $\mathbf{91_7}$ through $\mathbf{91_{13}}$ are flux switched leaving the flux in the remaining counting and guard legs undisturbed. This set flux condition is indicated by the arrows *ff* below the appropriate counting legs 91. The magnetic flux distribution thus resulting will remain due to the square loop characteristics of the core structure 90 material pending the initiation of a subsequent output phase of operation.

An output phase is initiated immediately upon the application of a clock pulse from the external clock source, not shown, to the drive monopulser 100. The latter circuit operates responsive to a triggering negative clock pulse in a manner identical to that described for the drive monopulser 30 of the embodiment of FIGS. 1 and 2. Accordingly, a positive pulse is now applied to the drive winding 96. In this case, however, because of the opposite sense of the winding 96 from that of the drive winding 16 of FIG. 1, the magnetomotive force generated is in a direction such as to restore any flux set in the legs 91 during the input phase to its normal direction. Since the counting leg $\mathbf{91_1}$ is already remanently flux saturated in that direction, only a negligible flux excursion can result. The next succeeding counting legs $\mathbf{91_2}$ and $\mathbf{91_3}$, however, are in a set flux condition, so as the result of the maintained constant voltage pulse applied to the drive leg 94, the resetting flux will close immediately through the counting leg $\mathbf{91_2}$ which, in accordance with the flux propagation principles of this invention, presents the shortest available closure path. The switching of the counting leg $\mathbf{91_2}$ induces a step output voltage signal in the coupled step output winding 97 which, in the manner previously described, is transmitted to the feedback amplifier 110 via the conductor 104 to cut off the drive monopulser 100 and hence interrupt the drive voltage pulse being applied to the drive winding 96. Further flux propagation to restore the normal flux distribution in the magnetic structure 90 is also thereby interrupted.

In addition to controlling the feedback amplifier 110, the step output signal generated by the switching of the leg $\mathbf{91_2}$ is also applied to the serial output terminal 107 via the conductor 106. At the latter terminal, the signal is available as the first of a series of periodic signals representing the input information converted to its decimal coded form. Upon the next application of a clock pulse to the drive monopulser 100 the resetting flux propagation is resumed, this time finding a switching and, therefore, a closure path, through the set counting leg $\mathbf{91_3}$. The latter leg switches to repeat the stepping operation and the application of another output signal on the serial output terminal 107. The immediately following step of propagating flux caused by the re-energization of the drive winding 96, however, finds the next counting legs $\mathbf{91_4}$ through $\mathbf{91_6}$ already normally flux remanent. As a result, these legs and the interposed guard legs are bypassed by the flux step for the shortest available flux path. This is presented by the next set counting leg $\mathbf{91_7}$. As the latter leg switches its flux, the voltage generated in its coupled step output winding 97 repeats the cutoff of the drive voltage signal in the drive winding 96 and the application of the next sequential signal on the serial output terminal 107. Since the remaining counting legs $\mathbf{91_8}$ through $\mathbf{91_{13}}$ are all set as was described in connection with the input phase of operation, the steps of flux propagation will continue uninterruptedly until the entire magnetic structure 90 has been restored to its normal directional flux distribution. At the resetting of flux in each of the legs $\mathbf{91_8}$ through $\mathbf{91_{13}}$, an ouput signal appears on the serial output terminal 107. The sequential resetting of each of the counting legs previously set during the input phase thus results in a train of output signals on the serial output terminal 107. As a result of the foregoing sequential resetting operation, nine such serial output signals are generated to represent the two-out-of-five input information converted to the decimal code. An inspection of the conversion table presented earlier herein determines this serial output to be as expected.

It should be noted that no matter what the interval between set counting legs, no substantial difference between the intervals separating the sequential output signals on the serial output terminal 107 results. The propagating flux in bypassing unavailable counting legs closes immediately through the next shortest available flux path without appreciable delay. The flux propagation behavior in the core structure 90 and the effect of the biasing winding 95 on that behavior follows precisely that described in conjunction with the embodiment of FIGS. 1 and 2. Thus the function of the guard legs $91_g$ alternating with the counting legs has also been previously described herein. Accordingly, a description of these principles need not be repeated at this point. Obviously, by rearranging the input wiring alone or in conjunction with an addition of counting and guard legs, various other code conversions may be envisioned by one skilled in the art without requiring essential changes in the basic circuit configuration and operation just described.

Figure 6:
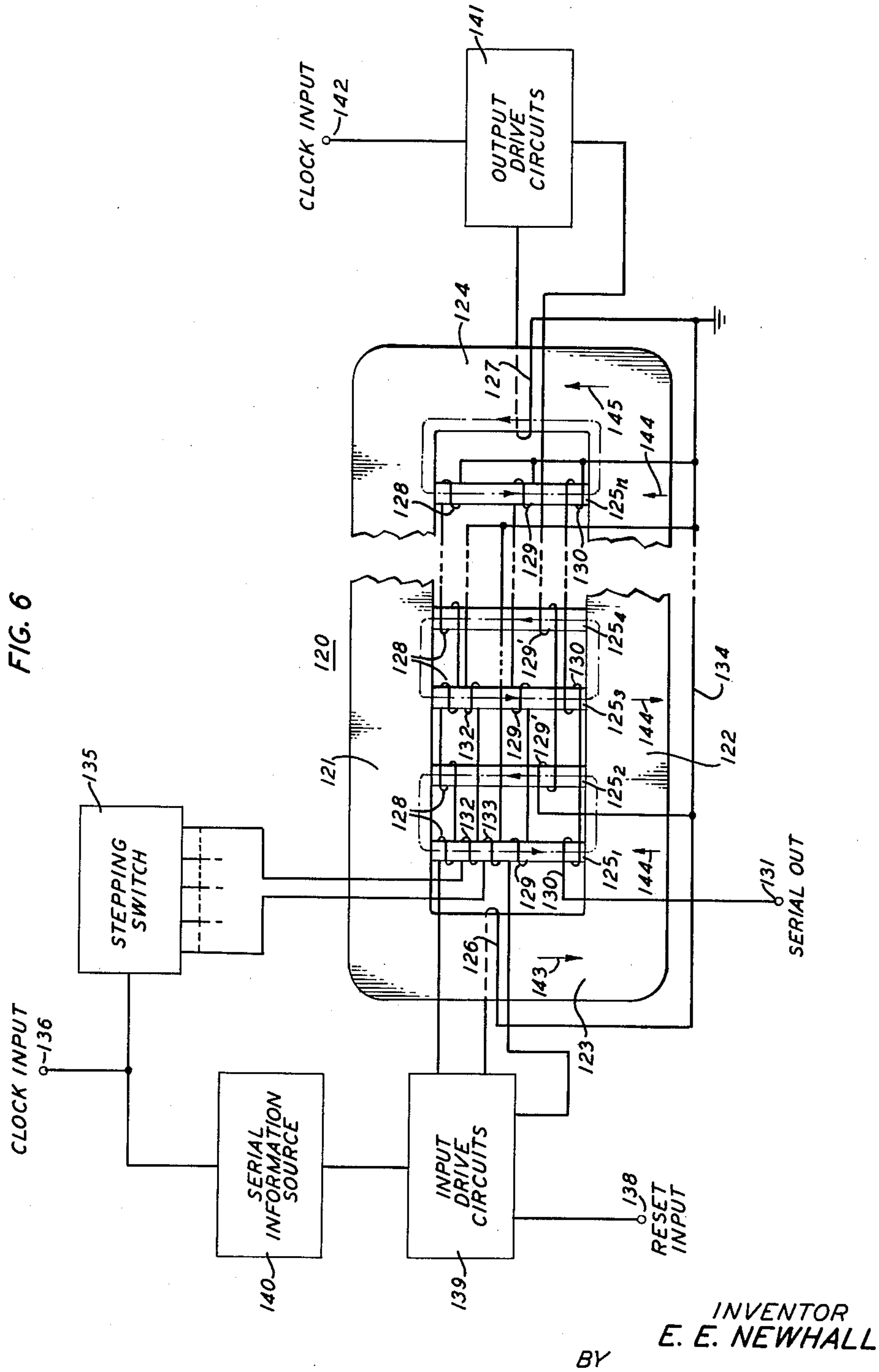
FIG. 6 depicts still another illustrative embodiment of this invention adapted as a serial-in-serial-out binary storage circuit.

The versatility of adaptation of this invention is further demonstrated by the specific illustrative embodiment thereof depicted in FIG. 6. The arrangement there shown is adapted as a memory device permitting a serial input of information, its permanent storage, and its serial output when required. The magnetic switching means again comprises a magnetic structure substantially similar to that employed in both the illustrative embodiment of FIGS. 1 and 2 and of FIG. 5. Thus, a magnetic structure 120 having a pair of side rails 121 and 122 and an input drive leg 123 is provided. Unlike the magnetic structures of the previous embodiments, however, the structure 120 is formed also to provide an output drive leg 124. Included between the side rails 121 and 122 and drive legs 123 and 124 are a plurality of counting legs $125_1$ through $125_n$ formed integrally therewith. The magnetic structure 120 may advantageously also be of a magnetic material exhibiting substantially rectangular hysteresis characteristics, and in cross section and dimensional relationship of counting legs, drive legs, and side rails, is substantially similar to the structures 10 and 90 described previously herein.

The drive legs 123 and 124 have inductively coupled thereto an input drive winding 126 and an output drive winding 127, respectively. Each of the counting legs 125 has inductively coupled thereto a plurality of energizing and control windings. To each of the legs 125 is coupled a reset winding 128, the coupling to each leg being in a sense opposite to that of either adjacent leg. The reset windings 128 are serially connected at one end to ground. As demonstrated in the present embodiment, a reset winding may be coupled to the structure in any manner so that required ones of the available flux paths are linked. Step output windings 129 and 129' are also coupled to the counting legs 125, the output windings 129 of the counting legs $125_1$, $125_3$, and $125_n$ being serially connected in the same sense at one end to ground and the output windings 129' of the counting legs $125_2$ and $125_4$ being serially connected also in the same sense at one end to ground. Each of the counting legs $125_1$, $125_3$, and $125_n$ has coupled thereto in addition to the windings already described, a serial output winding 130. The latter output windings are serially connected in the same sense at one end to ground and at the other end to a serial ouput terminal 131.

Positive control of flux propagation in the present embodiment is achieved through biasing windings 132 and 133 coupled to selected counting legs as determined by the particular sequence of information storage desired. In the present case the counting legs $125_1$ and $125_3$ each has a biasing winding 132 coupled thereto which windings are serially connected at one end to ground. The counting leg $125_1$, additionally has a biasing winding 133 coupled thereto, which winding is connected at one end to ground. Ground connections for each of the windings described may be achieved by a common ground bus 134. As will be appreciated in connection with the description of the operation of the present embodiment hereinafter, the biasing of the flux propagation which in the previous illustrative embodiments promoted a more efficient utilization of the structure, in the present case is selectively controlled to realize the utilization of the core structure to perform an information switching function.

In the input organization of elements of the present illustrative embodiment, the serially connected biasing windings 132 and the biasing winding 133 are connected at the other end to a multiple terminal stepping switch 135 of a character well-known in the art. As will appear hereinafter, in actual practice the switch 135 would have a number of output terminals corresponding to the number of elements of the serial input information to be stored. The operation of the stepping switch 135 may be controlled by a clock pulse supplied from a source, not shown, to the clock input terminal 136. The other end of the input drive winding 126, the other end of the serially connected reset windings 128 and the other end of the step output windings 129 coupled to the legs $125_1$, $125_3$, and $125_n$ are connected to suitable terminals of input drive circuit 139. The latter circuits may advantageously comprise components identical to those described for the drive circuitry of the illustrative embodiment of FIGS. 1 and 2. Thus, the foregoing terminals end connections may also be made in the manner described in connection with the previous circuitry. The input drive circuits 139 are controlled by control pulses supplied from a serial information source 140 and, as previously described herein, from energized step output windings 129. Reset control is achieved by reset control pulses from an external source, not shown, applied to a reset input terminal 138. The operation of the serial information source may also be controlled by the clock pulses applied to the clock input terminal 136.

The output organization of the embodiment of FIG. 6 includes output drive circuits 141 to which both the output drive winding 127 and the serially connected step output windings 129' coupled to the legs $125_2$ and $125_4$ are connected. The output drive circuits 141 are controlled by clock pulses supplied by an external clock pulse source, not shown, to the clock input terminal 142 as well as step signals applied from energized step output windings 129'. The output drive circuits 141 may advantageously comprise components identical to those described for the drive circuitry of the illustrative embodiment of FIG. 5. Thus, since the reset control function is accomplished by the input drive circuits 139, no reset circuitry need be included in the output drive circuits 141.

A normal or reset flux distribution is established by the application of a properly poled reset pulse to the reset input terminal 138 from an external source, not shown. This may be timed to occur immediately before an input phase of operation and, in response thereto, a reset monopulser of the input drive circuits 139, described in connection with the embodiment of FIGS. 1 and 2, is triggered to apply a positive reset pulse to the reset windings 128. Since the windings 128 are wound on the legs $125_1$ through $125_n$ in alternating senses, the induced fluxes will also be in the alternating directions in the legs 125 as indicated by the broken lines in FIG. 6. With the normal flux distribution in the core structure 120 as described above and shown in FIG. 6, the circuit is prepared for the serial introduction of input information.

In order to describe an illustrative storage operation of the present embodiment, the introduction of an exemplary binary word, 1, . . . 0, 1, will be assumed. In accordance therewith an input signal representing the first information bit of the word is applied to the input drive circuits 139 from the information source 140. This signal is timed to occur under the control of a clock pulse applied to the clock input terminal 136. As a result, a positive constant voltage pulse is applied to the input drive winding 126 which latter winding is in a sense such that a flux saturation in the direction indicated by the arrow 143 commences. At this time, however, and simultaneously with the application of pulse representing the input information bit from the source 140, a positive biasing current is applied to the biasing windings 132 from the external biasing source comprising the stepping switch 135. Simultaneous operation is insured by the common control of the clock input signal at the terminal 136. The biasing windings 132 are coupled to the counting legs $125_1$ and $125_3$ and are in a sense such as to maintain the normal flux in these legs against any switching action of flux closure from the input drive leg 123. Closure through the legs $125_1$ and $125_3$ is thus denied to the switching flux being induced by the input drive voltage pulse on the input drive winding 126. The next succeeding shortest flux paths are presented by the legs $125_2$ and $125_4$, however, these legs are already remanently magnetized in the switching direction and thus permit only a negligible flux change. The nearest available flux path is ultimately presented by the counting leg $125_n$ and the flux being induced in the input drive leg now closes to the latter leg.

By the cooperation of the normal flux distribution and the selectively applied bias, flux propagation in the structure 120 is thus controlled to accomplish the isolated switching of the counting leg $125_n$ alone. This flux switching induces a step voltage signal in its coupled step output winding 129 which signal may be traced through the output windings 129 coupled to the counting legs $125_1$ and $125_3$ to the input drive circuits 139 where the step output voltage signal is effective to control the interruption of the input drive voltage pulse being applied to the input drive winding 126. Further flux propagation is thus precluded pending the introduction of a subsequent information bit.

The normal flux distribution has thus been rearranged as the result of the introduction of the first binary value "1" only to the extent that the polarity of the remanent flux in the counting leg $125_n$ is reversed. Had no input pulse been applied from the source 140 during the first bit input, that is, had the information bit been a binary "0," no flux propagation would have been initiated and the normal flux distribution would have remained undisturbed. During the second bit interval a clock pulse at the terminal 136 again enables both the information source 140 and the bias stepping switch 135. The biasing current during this next succeeding bit interval is applied as a result of the step of the switch 135 to a biasing winding controlling the storage of a bit in the corresponding next succeeding counting leg. In accordance with the instant binary word constituting the series of bits, 1, . . . 0, 1, being stored, this is the biasing winding 133 coupled to the counting leg $125_1$ alone. This biasing current is again in a direction such as to maintain the remanent flux in that leg in its normal direction against the action of any closing switching flux. Since for this bit interval a bias is applied to only the leg $125_1$, the next nearest counting leg $125_3$ will be available as a path for closing switching flux propagated from the input drive leg 123. Should the next information bit in the series of bits of the binary word to be stored be a "1," the representative input signal from the source 140 would be effective to control the application of another input drive voltage pulse from the drive circuits 139 to the drive winding 126. The resulting next step of flux propagation would switch the flux in the leg $125_3$ thereby again causing a step output signal on its winding 129 to interrupt the applied input drive voltage pulse.

The next information bit in the series of bits to be considered, however, is a binary "0." Thus, during the enabling time of the clock pulse to the information source 140 and stepping switch 135, no triggering signal is applied to the input drive circuits 139. Flux propagation as a result does not occur during this second bit interval of the illustrative operation being described. The flux redistribution resulting from the introduction of the first input bit remains unchanged pending the next succeeding bit interval. During the next interval of the bit intervals being considered, a binary "1" is to be stored in the circuit. This is accomplished in the manner described above with the application of an enabling clock pulse to the information source 140 and stepping switch 135. Responsive to the operation of the input drive circuits 139, a drive voltage pulse applied to the drive winding 126 recommences a flux propagation in the magnetic structure 120. At this time, however, since the last element of the binary word is to be stored in the last counting leg $125_1$ of the magnetic structure 120, no biasing winding is provided. Thus the stepping switch 135 may be arranged such that no output signal is effectively transmitted during this last bit interval. It will be recalled that as the result of the introduction of the "0" information bit in the preceding bit interval, the flux in the counting leg $125_3$ was left undisturbed. Accordingly, the propagating flux step may now find its closure by switching the flux in either the unheld leg $125_1$ or $125_3$. In accordance with the preferential flux propagation principles of this invention closing of flux will occur through the nearest leg $125_1$. The flux in the latter leg will switch thereby generating a step output signal in its coupled output winding 129 which signal again arrests further flux propagation.

The input phase of operation is thus completed and the binary word 1, . . . 0, 1 is now stored in the reverse order in the counting legs $125_1$ through $125_n$, respectively. The direction of the magnetic fluxes representing these values is indicated in FIG. 6 of the drawing by arrows 144 appearing below the respective counting legs. It is apparent that, although in the above described operation the entire side rail and input drive leg cross sections were not necessary to perform the storage operation, in another case closure of flux in each of the counting legs $125_1$ through $125_n$ may be necessitated through the side rails 121 and 122 and the input drive leg 123.

An output phase of operation of the embodiment of FIG. 6 is controlled by the application of periodic clock pulses from an external source not shown, to the terminal 142 of the output drive circuits 141. The latter clock pulses may be initiated at any subsequent time at which a readout of the stored information is desired. Responsive to a first of such clock pulses, the output drive circuits 141 apply a constant drive voltage pulse to the output drive winding 127. The polarity of the drive pulse and the sense of the winding 127 are such that a saturation flux is initiated in the output drive leg 124 in the direction indicated in FIG. 6 by the arrow 145. As previously described herein, flux closure will be through the nearest counting leg which in this case is the leg $125_n$. As the flux in the latter leg is switched, an information output signal is induced in the output winding 130 coupled thereto. The information signal is transmitted via other serially connected output windings 130 and made available at the serial information output terminal 131 as the "1" information bit of the binary word previously stored.

The output drive pulse presently being applied to the drive winding 127 is maintained and, as the leg $125_n$ becomes fully saturated, flux propagation is continued through the next shortest available flux path. This path is presented by the adjacent counting leg $125_4$, the flux in which latter counting leg is also caused to switch. As the result of the latter flux switching, a step output signal is generated in the coupled step output winding 129' to cut off the output drive circuits 141 in the manner previously described. The latter circuits are again energized responsive to a succeeding clock pulse to continue the flux saturation of the output drive leg 124 during the next output bit interval. Since a binary "0" is stored in the next counting leg $125_3$ only a negligible output switching flux closure is possible through that leg and accordingly no appreciable output signal is generated in its coupled output winding 130. During the instant bit interval then, the fact of only a negligible or shuttle signal on the information bit output terminal 131 is indicative of a binary "0." Flux closure, however, is fully possible through the counting leg $125_2$ and the flux switching of the latter leg again induces a step output signal in its coupled output winding 129′. The latter signal again cuts off the output drive circuits 141 to arrest further flux propagation. The sequence of operations is repeated responsive to a succeeding clock pulse on the terminal 142 with another output signal appearing on the output terminal 131 as a consequence of the switching flux closure through the last counting leg $125_1$. The output drive circuits 141 need not at this time be controlled to interrupt the applied output drive pulse before such cutoff would normally occur since further flux propagation in the structure 120 is immaterial to subsequent operation of the circuit. Each of the binary values 1, . . . 0, 1 of the exemplary word serially introduced and stored in the core structure 120 has thus been serially read out.

Before another input phase of operation may be commenced, a reset pulse applied to the reset input terminal 138 is effective to restore the magnetic structure 120 to its normal flux distribution as previously explained and as indicated in FIG. 6. In the embodiment of the latter figure advantageous utilization is made of the flux changes in each of the successive legs. Thus information bits are actualy stored in one group of alternating legs, $125_1$, $125_3$, and $125_n$, during the input phase and the flux changes in the other group of alternating legs, $125_2$ and $125_4$ are employed to control the output circuitry during the output phase of operation. In this embodiment also the biasing is selectively performed to control the selective allocation of the input information bits to the proper bit addresses of the structure 120. In this connection reference may be made to the broken presentation of the structure 120 in FIG. 6 and the understanding implicit therein that the structure 120 may be adapted to store a binary word comprising almost any number of bits. To facilitate this understanding, the biasing circuits may be generalized to cover any case. Referring to the alternating group of counting legs in which the information is actually stored, a biasing circuit is provided for all except the last of the bits to be stored. Each of the biasing circuits includes serially connected biasing windings coupled to the respective counting legs, the number of biasing windings in each biasing circuit being determined such that each of the successive information storing counting legs preceding the one in which an information bit is being stored will be flux held as the biasing circuits are successively energized. Obviously since no such counting legs precede the last counting leg in which a bit may be stored, no biasing is required for storing in the latter leg. The particular sequence of legs assumed here is the physical presentation reading from the input side of the structure 120 rather than the functional sequence in which information is introduced, which latter sequence would be the reverse of the former.

In the foregoing embodiments code conversion or storage functions were accomplished in which combinatorial outputs were generated as determined by the particular output networks utilized. Each of the embodiments aforedescribed involved the basic principles of step-by-step controlled flux propagation in a magnetic structure and thus presented basically related means for advantageously applying the principles of this invention. As stated in the introduction herein, simple commutation and counter arrangements may be realized by adapting the step-by-step flux control principles and substantially similar core structures described hereinbefore. Thus, as the flux is controlled to successively close through the legs of a magnetic structure such as that of FIG. 1, for example, an output on each of successive selected counting legs is energized to produce a sequential output signal. A signal on the last of such output windings may then be utilized to either control the resetting of the flux distribution to its normal state or to indicate the progression through the core structure of a predetermined number of flux steps or both. In the latter case, a counting circuit to any radix is readily achieved.

The positive control of flux propagation in discrete steps through spaced counting legs of the magnetic structure according to this invention was provided in previous embodiments by the simultaneous energization of a biasing winding. It will be recalled that such a biasing winding, coupled to either a side rail or particular counting legs made possible the positive use of alternating legs in the embodiment of FIGS. 1 and 2, for example, the remaining alternating legs in this case then advantageously constitute flux guard legs to insure complete isolation of the counting legs.

Figure 7:
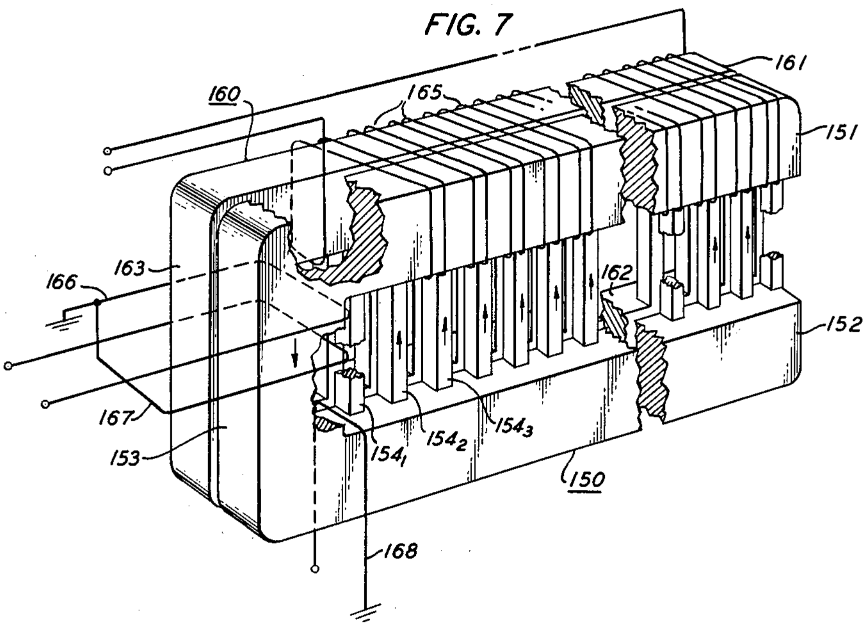
FIG. 7 illustrates in perspective view a dual core structure for achieving a positive control of flux propagation in accordance with one aspect of this invention.

In FIG. 7 is shown a manner of practicing this invention which when employed in cooperation with a biasing winding, makes possible the use of adjacent legs as counting legs in a core structure without resorting to the convenience of guard legs. A pair of identical core structures 150 and 160 are utilized, each being substantially similar to the magnetic structures employed in previous embodiments described herein. Thus each may advantageously have a cross section such as depicted in FIG. 3 to insure the aforestated minimum cross-sectional area relations between side rails, drive legs and counting legs. The core structure 150 thus comprises a pair of side rails 151 and 152 and a drive leg 153 including therebetween a plurality of counting legs $154_1$, $154_2$, $154_3$, etc. Similarly, the core structure 160 comprises a pair of side rails 161 and 162 and a drive leg 163 also including therebetween a plurality of counting legs. The side rail 162 and the counting legs of the structure 160 are only partially visible in the perspective view of FIG. 7. The core structures 150 and 160 are placed back-to-back so that the apertures of each defining the counting legs coincide. A biasing winding 165 is wound through the apertures of each structure 150 and 160 around the side rails 151 and 161 in a manner such that only the first aperture of the far core structure 160, as viewed in the drawing, is threaded once and each successive aperture of both structures 150 and 160 is threaded twice. The latter winding ratio is illustrative and offered for purposes of description only; other ratios may be employed as determined by particular circuit and other considerations encountered in actual practice. A drive winding 166 and a reset winding 167 are coupled to both of the drive legs 153 and 163. A single step output winding 168 is coupled through the first aperture to only the side rail 152 of the core structure 150. Other windings including output windings would be coupled to various portions of the structures 150 and 160 in a particular adaptation; however, the foregoing are sufficient to describe the present biasing aspect of this invention.

An initial normal flux distribution may be assumed to have been established in a previous reset operation in both of the core structures 150 and 160 in the directions indicated by the arrows in each of the legs of the structure 150. As a result of the particular threading of the biasing winding 165 described above, the flux path defined by the leg $154_1$ of the structure 150 is not linked and the path presented by the first leg of the structure 160 is linked only once. The path defined by the leg $154_2$ of core structure 150 is linked twice and the path of the second leg of the structure 160 is linked three times. The biasing winding 165 continues to link the successive flux paths represented by the remaining counting legs of each core structure 150 and 160 in the same manner with each successive path of the core structure 160 being linked one more turn than the corresponding path of the core structure 150.

Upon the application of a first drive pulse to the drive winding 166 and the simultaneous energizing of the biasing winding 165, the flux in the leg $154_1$ of core structure 150 will switch first. Since the latter leg is free of any biasing effect and its corresponding leg of the core structure 160 is biased by one turn of the winding 165, the leg $154_1$ will switch completely while its corresponding leg switches only partially because of the single-turn bias. As the leg 154 switches its flux a step output signal is generated in the step output winding 168 coupling all of the flux paths in the structure 150 alone. This step output signal is then utilized to control the interruption of the applied drive pulse in the manner previously described.

Since the biasing winding 165 applies a double-turn bias to the flux path defined by the next adjacent counting leg $154_2$ no flux switching takes place in the latter leg simultaneously with the flux switching in the leg $154_1$. The power expended by the applied drive pulse on a drive winding in previously described embodiments it will be recalled, caused a flow over of flux into an adjacent guard leg before it was interrupted. Here this power is diverted to cause a collateral flux switching in a second core structure 160 which thus accordingly serves a guard function. Upon each succeeding application of a drive pulse to the drive winding 166 each successive flux path of the magnetic structure 160 will have a greater biasing magnetomotive force applied thereto than its corresponding flux path in the core structure 150 due to the manner of threading the biasing winding 165. Simultaneous flux switching in adjacent counting legs 154 of the core structure 150 is thus effectively precluded and the flux propagation in discrete steps through successive adjacent counting legs of the structure 150 is thus made possible. When the particular conversion or stepping operation performed by an adaptation of the embodiment of FIG. 7 has been completed, a reset pulse applied to the reset winding 167 will restore the flux distribution in both of the structures 150 and 160 to its normal state.

In describing the foregoing illustrative embodiments of this invention only basic and illustrative circuit elements and values have been presented. Specific values and elements may be readily determined by one skilled in the art as suggested by the context in which this invention is practiced. The embodiments which have been described herein are also considered to be only illustrative of the principles of this invention. Accordingly, it is to be understood that various and numerous other arrangements may be devised by one skilled in the art without departing from the scope of this invention. The features and aspects of this invention described but not claimed herein are claimed in copending application, Serial No. 329,807, filed December 11, 1963.

What is claimed is:

1. An electrical circuit comprising a magnetic structure capable of assuming stable remanent flux states, said structure being formed to include a drive leg and a plurality of counting legs, a drive winding on said drive leg, a pulse source for initiating an input pulse on said drive winding to induce a switching flux in said drive leg, said switching flux being closed through one of said counting legs, an output winding on said last-mentioned counting leg energized responsive to a flux change therein for generating an output signal, and means responsive to said output signal for controlling said pulse source to terminate said input pulse.

2. An electrical circuit comprising a magnetic structure capable of assuming stable remanent flux states, said structure being formed to include a drive leg and a plurality of counting legs, a drive winding on said drive leg, a pulse source for initiating a series of input pulses on said drive winding to induce successive steps of flux in said drive leg, said flux steps being closed through successive ones of said counting legs, a plurality of step output windings on said last-mentioned counting legs, respectively energized responsive to flux changes in said last-mentioned counting legs for generating output signals, and means responsive to said output signals for controlling said pulse source to successively terminate each pulse of said series of input pulses.

3. An electrical circuit comprising a magnetic structure capable of assuming stable remanent flux states, said structure being formed to include a pair of side rails having a drive leg and a plurality of counting legs therebetween, reset means including a reset winding for inducing a reset flux in said drive leg, said reset flux being closed through each of said counting legs, a drive winding on said drive leg, a pulse source for initiating each pulse of a series of pulses on said drive winding to induce successive steps of switching flux in said drive leg, said switching flux steps being closed through successive ones of said counting legs, a step output winding on each of said last-mentioned counting legs energized responsive to flux changes in said last-mentioned counting legs for generating step signals, and means responsive to said step signals for controlling said pulse source to successively terminate each pulse of said series of input pulses.

4. An electrical circuit according to claim 3 also comprising a code output winding on at least a selected one of said counting legs energized responsive to a reset flux closure for generating a code output signal.

5. An electrical circuit according to claim 3 also comprising a reset output winding on one of said counting legs energized responsive to a switching flux closure for generating a reset output signal, and means responsive to said reset output signal for controlling said reset means.

6. An electrical circuit according to claim 3 in which the minimum cross-sectional area of each of said side rails and said drive leg are at least equal to the sum of the minimum cross-sectional areas of said counting legs.

7. An electrical circuit according to claim 3 also comprising code output windings on each of said counting legs, said code output windings being interconnected in an output network having a plurality of code output terminals.

8. An electrical circuit according to claim 3 also comprising a biasing winding coupled to said structure in a manner such as to link all but the first of successive flux paths defined by said drive leg and said counting legs, and means for energizing said biasing winding simultaneously with each of the pulses of said series of pulses initiated on said drive winding.

9. In a telephone system, a dial pulse conversion circuit comprising a magnetic structure capable of assuming stable remanent flux states, said structure being apertured to form a drive leg and a plurality of counting legs, said drive leg having a reset flux therein closed through each of said counting legs, a drive winding on said drive leg, dial controlled means for initiating successive input drive pulses on said drive winding to induce successive steps of switching flux in said drive leg corresponding to a dialed directory number in one code, said switching flux steps being closed through successive ones of said counting legs, a step output winding on each of said last-mentioned counting legs energized responsive to switching flux closures for generating step signals, means responsive to said step signals for controlling said dial controlled means to successively interrupt said input drive pulses, a plurality of code output windings on each of said counting legs, and a plurality of code output circuits serially connecting particular ones of said code output windings in predetermined combinations and senses in accordance with another code.

10. A code conversion circuit comprising a magnetic structure capable of assuming stable remanent flux states, said structure being apertured to form a drive leg and a plurality of counting legs, code input windings on each of said counting legs, a plurality of code input circuits serially connecting particular ones of said code input windings in predetermined combinations and senses, said code input circuits being selectively energizable in accordance with input informations in one code to induce a flux in each of particular coded ones of said counting legs, each of said induced fluxes being closed through said drive leg, a drive winding on said drive leg, means including a pulse source for initiating successive drive pulses on said drive winding to induce successive steps of switching flux in said drive leg, said switching flux steps being successively closed through said particular coded ones of said counting legs, a step output winding on each of said last-mentioned counting legs energized responsive to switching flux closures for generating step signals, means responsive to said step signals for controlling said pulse source to successively interrupt said drive pulses, said step signals also being representative of said input information in another code.

11. An electrical circuit comprising a magnetic structure capable of assuming stable remanent flux states, said structure being formed to present a plurality of discrete flux loops of progressively increasing lengths, said flux loops sharing a common drive leg of said structure, reset means coupled to said drive leg for inducing a reset flux in each of said flux loops, drive means coupled to said drive leg for initiating a switching flux in said drive leg, said switching flux being closed through the shortest available flux loop, a step winding linked to said last-mentioned loop energized responsive to switching flux closures to generate a step signal, and control means responsive to said step signal for controlling said drive means to interrupt said switching flux.

12. An electrical circuit according to claim 11 also comprising means for subsequently energizing said drive means for initiating other switching fluxes in said drive leg, said other switching fluxes being successively closed through available flux loops of progressively increasing lengths, other step windings linked to said last-mentioned flux loops energized responsive to subsequent switching flux closures to generate a sequence of additional step signals, said control means also being responsive to said additional step signals for subsequently controlling said drive means to successively interrupt said other switching fluxes.

13. An electrical circuit according to claim 12 also including a biasing winding linked to each except the shortest of said flux loops, and means for energizing said biasing winding simultaneously with the energization of said drive means for progressively inhibiting switching flux closures in succeeding ones of said flux loops.

14. An electrical circuit according to claim 12 also comprising output windings linked to at least a selected one of said flux loops energized responsive to switching flux closure for generating an output signal.

15. An electrical circuit according to claim 14 also comprising means responsive to said output signal for controlling said reset means.

16. An electrical circuit comprising a magnetic structure capable of assuming stable remanent flux states, said structure being apertured to form a pair of side rails having an input drive leg at one end followed by a succession of alternating counting and control legs therebetween, each of said side rails and said input drive leg having a minimum cross-sectional area equal to at least the sum of the minimum cross-sectional areas of said counting and control legs, reset means for inducing a reset flux in each of said counting legs in a first direction and in each of said control legs in the opposite direction, an input drive winding on said input drive leg, means including an input drive pulse source for initiating input drive pulses on said input drive winding for initiating a sequence of steps of setting flux in said input drive leg in accordance with a sequence of input information, each of said setting flux steps being closed through a particular one of said counting legs to set said last-mentioned counting legs in said opposite direction, biasing means energized simultaneously with each of said input drive pulses for inhibiting setting flux closure through all but said particular one of said counting legs, first step output windings on each of said counting legs energized responsive to setting flux closures through said counting legs for generating first step output signals, and means responsive to said first step output signals for controlling said input drive pulse source for interrupting said input drive pulses.

17. An electrical circuit according to claim 16 in which said magnetic structure also is apertured to form an output drive leg between said side rails at the other end, said output drive leg having a minimum cross-sectional area also equal to at least the sum of the minimum cross-sectional areas of said counting and control legs and also comprising an output drive winding on said output drive leg, means including an output drive pulse source for subsequently initiating output drive pulses on said output drive winding for initiating a sequence of output flux steps in said output drive leg, each of said output flux steps being progressively closed through set ones of said counting legs and said control legs in said first direction, second step output windings on each of said control legs energized responsive to output flux closures through said control legs for generating second step output signals, and means responsive to said second step output signals for controlling said output drive pulse source for interrupting said output drive pulses.

18. An electrical circuit according to claim 17 also comprising an information output winding on each of said counting legs energized responsive to output flux closures in said counting legs for generating a sequence of information output signals corresponding to said sequence of input information.

19. An electrical circuit comprising a magnetic structure capable of assuming stable remanent flux states, said structure being apertured to form a pair of side rails having a first drive leg at one end and a second drive leg at the other end and a plurality of alternating first and second counting legs therebetween, means for inducing a reset flux in each of said first counting legs in a first direction and in each of said second counting legs in the opposite direction, a first drive winding on said first drive leg, means including a first drive pulse source for initiating first drive pulses on said first drive winding for initiating switching flux steps in said first drive leg, said switching flux steps being successively closed through said first counting legs in the opposite direction, first step output windings on each of said first counting legs energized responsive to switching flux closures through said first counting legs for generating first step output signals, and means responsive to said first step output signals for controlling said first drive pulse source for interrupting said first drive pulses.

20. An electrical circuit according to claim 19 also comprising biasing winding means coupled to one of said side rails for successively inhibiting switching flux closures through successive first counting legs following the one through which a given flux step is being closed, said biasing winding means being energized simultaneously with each of said first drive pulses.

21. An electrical circuit according to claim 20 also comprising a second drive winding on said second drive leg, means including a second drive pulse source for initiating second drive pulses on said second drive winding for initiating switching flux steps in said second drive leg, said last-mentioned flux steps being successively closed through said second counting legs in said first direction, second step output windings on each of said second counting legs energized responsive to switching closures through said second counting legs for generaing second step output signals, and means responsive to said second step output signals for controlling said second drive pulse source for interrupting said second drive pulses.

22. An electrical circuit according to claim 21 also comprising output windings selectively coupled to said first and said second counting legs energized responsive to flux closures in said last-mentioned legs for generating output signals.

23. A magnetic control device comprising a magnetic structure formed to present a plurality of discrete magnetic flux loops, a drive portion of said structure being common to each of said loops, and means for successively propagating flux in discrete steps in said flux loops comprising drive means for applying a magnetomotive force to said drive portion of a magnitude sufficient to induce a flux in all of said flux loops, winding means linked to each of said flux loops energized responsive to flux propagation in each of said loops for generating output signals, means responsive to said output signals for controlling said drive means to successively interrupt said magnetomotive force, and means for successively controlling said drive means to reapply said magnetomotive force after each of said interruptions.

References Cited in the file of this patent

UNITED STATES PATENTS

| | | |
|---|---|---|
| 2,835,741 | Vaughan | May 20, 1958 |
| 2,846,671 | Yetter | Aug. 5, 1958 |
| 2,869,112 | Hunter | Jan. 13, 1959 |
| 2,905,934 | Flint | Sept. 22, 1959 |
| 2,923,923 | Raher | Feb. 2, 1960 |
| 2,951,245 | Kihn | Aug. 30, 1960 |